(12) United States Patent
Yoneno

(10) Patent No.: US 7,714,941 B2
(45) Date of Patent: May 11, 2010

(54) CONTROL SYSTEM AND CONTROLLED APPARATUS AND CONTROL APPARATUS ADAPTED TO THE SYSTEM

(75) Inventor: Kunio Yoneno, Shiojiri (JP)

(73) Assignee: Seiko Epson Corporation (JP)

( * ) Notice: Subject to any disclaimer, the term of this patent is extended or adjusted under 35 U.S.C. 154(b) by 1150 days.

(21) Appl. No.: 11/295,817

(22) Filed: Dec. 7, 2005

(65) Prior Publication Data

US 2006/0139451 A1 Jun. 29, 2006

(30) Foreign Application Priority Data

Dec. 9, 2004 (JP) .............................. 2004-356418

(51) Int. Cl.
*H04N 5/44* (2006.01)
(52) U.S. Cl. .................... 348/734; 348/14.05; 348/114; 348/116; 340/426.13; 340/815.6
(58) Field of Classification Search ................. 348/734, 348/114, 116, 14.05; 340/426.13, 423.22, 340/815.6
See application file for complete search history.

(56) References Cited

U.S. PATENT DOCUMENTS 5,822,099 A 10/1998 Takamatsu
7,268,830 B2 * 9/2007 Lee ............................ 348/565

FOREIGN PATENT DOCUMENTS

| JP | 01-109867 | 4/1989 |
|---|---|---|
| JP | 05-137200 | 6/1993 |
| JP | 08-214183 | 8/1996 |
| JP | 9-69816 | 3/1997 |
| JP | 11-243629 | 9/1999 |
| JP | 11-345087 | 12/1999 |
| JP | 2000-207122 | 7/2000 |
| JP | 2000-321530 | 11/2000 |
| JP | 2000-321531 | 11/2000 |
| JP | 2001-094900 | 4/2001 |

* cited by examiner

*Primary Examiner*—David L Ometz
*Assistant Examiner*—Jean W Désir
(74) *Attorney, Agent, or Firm*—Harness, Dickey & Pierce, P.L.C.

(57) ABSTRACT

A control system includes a controlled apparatus adjusting its operation based on a control signal from an independently cased control apparatus. The controlled apparatus includes an indicator light projector projecting indicator light in an invisible wavelength region so that an exiting direction thereof has a known regularity and change over time, a response signal receiver receiving a response signal in response to light reception from the control apparatus having received the indicator light, a relative position recognizer recognizing a relative position of the control apparatus to its housing based on the response signal, and an adjuster performing predetermined adjustment based on the recognition. The control apparatus includes an indicator light receiver receiving the indicator light, a response signal forming unit forming a response signal for the relative position recognizer, and a response signal transmitter transmitting the response signal toward the response signal receiver of the controlled apparatus.

17 Claims, 10 Drawing Sheets

CONTROL SYSTEM AND CONTROLLED APPARATUS AND CONTROL APPARATUS ADAPTED TO THE SYSTEM

BACKGROUND

1. Technical Field

The present invention relates to a control system configured by a television receiver as a controlled apparatus, for example, and a remote control (hereinafter, remote) or the like as a control apparatus corresponding thereto, for example, and a controlled apparatus and a control apparatus adapted to the system. As an example, the invention relates to a control system that estimates a position of a viewer who has a high probability of being located in a location substantially the same as a position where a remote is present and enables adjustment to effects of video and sound so that they may be adapted to the position of the viewer, and a controlled apparatus and a control apparatus adapted to the system.

2. Related Art

Historically, an audio and visual apparatus with a function of remote control position detection has been proposed. According to the apparatus, a remote receives an acoustic wave signal from an audio and visual apparatus corresponding to the remote, converts a reception level as an acoustic wave detection signal into a remote control signal, and transmits the signal toward the audio and visual apparatus. The audio and visual apparatus receives the transmitted remote control signal and uses the reception level contained in the signal as a remote control signal detection signal, scans the orientation of a speaker and directed the speaker toward a direction in which the remote control signal detection signal indicates the maximum reception level. Further, the apparatus recognizes a distance to the remote based on timing of transmission and reception of the signal related to the remote in the direction and stores the recognized value as remote control position information point by point, uses remote control position information with highest frequency among the stored information as an initial position of the remote, and controls the orientation of the speaker based on the remote control position information containing the initial position (see JP-A-8-214183, paragraphs 0007 to 0015, FIGS. 4 and 5).

Also, in JP-A-8-214183, control adapted to the preference and habit of a user by considering clock information, calendar time information, program information, etc. other than the information of direction of the remote or distance thereto has been proposed.

Further, optimization of acoustic effect according to a position of a viewer has been proposed. According to the proposal, a television receiver includes infrared light receiving means, and plural light receiving elements having different directivities provided in the receiving means receive infrared light from a remote to detect a direction in which the remote (i.e., a person with the remote) is located from an incident direction of the received infrared light, and then, the television receiver adjusts the sound volume balance of right and left speakers based on the detection result (see JP-A-1-109867, the middle part of upper left column to the middle part of lower right column on the second page, FIG. 1).

Similarly, there has been a proposal in which a television receiver main body includes plural personal detection infrared sensors respectively having directivities in different directions provided at the lower part thereof, and detects a direction in which a remote (i.e., a person with the remote) is located from an incident direction of the received infrared light from the remote using these plural personal detection infrared sensors, and then, the television receiver adjusts the sound volume balance of right and left speakers based on the detection result (see JP-A-5-137200, paragraphs 0005 to 0007, FIG. 1).

The above described existing technologies still have the following various unsolved problems. That is, since all of the above described technologies disclosed in the documents are to determine the direction in which the remote is located by receiving the remote side emission of light at the television receiver side, they have potentials to inhibit power saving in the remote, which is typically arranged so as to operate using a small battery with low capacity as a power supply, and cause complication that the battery must be frequently replaced.

Further, in the technology proposed in JP-A-8-214183, since audible sound is used as an acoustic wave signal from the audio and visual apparatus, it is inevitable that the viewer has discomfort throughout the adjustment depending on the degree of the acoustic signal to be applied. Furthermore, in the proposals of JP-A-1-109867 and JP-A-5-137200, it is necessary to provide a large number of light receiving elements at the remote side to improve the precision of position detection, however, the large number of light receiving elements cause upsizing of the remote. If the number of light receiving elements is reduced, the resolution of position detection can not be secured.

SUMMARY

An advantage of some aspects of the invention is to provide a control system capable of, while simplifying the configuration of a control apparatus side as a remote, for example, appropriately detecting the relative position with the control apparatus in a controlled apparatus as a television receiver, for example, and performing adequate adjustment to operation according to the detection result at the controlled apparatus side, and a controlled apparatus and a control apparatus adapted to the system.

The following technologies are proposed in the application.

(1) A control system includes a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, and the controlled apparatus includes an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, and the control apparatus includes an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus.

According to the control system of the above (1), since the indicator light projection with relatively high power consumption is performed at the controlled apparatus side, power saving can be realized at the control apparatus side that often adopts a form as a remote operating using a battery as a power supply and used by being placed on user's hand. Further, since the indicator light projected from the indicator light projector of the controlled apparatus is light in a wavelength region substantially within an invisible region, transmission and reception of information between the controlled apparatus and the control apparatus are never perceived by the user of the control system. Accordingly, there is no potential to cause any discomfort to the user even during a period in which the controlled apparatus adjusts its operation mode while transmitting and receiving information between the apparatuses.

(2) A controlled apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus includes an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer.

According to the controlled apparatus of the above (2), power saving can be realized at the control apparatus side corresponding to itself. That is, since the indicator light projection with relatively high power consumption is performed at the controlled apparatus side, power saving can be realized at the control apparatus side that often adopts a form as a remote operating using a battery as a power supply and used by being placed on user's hand. Further, since the indicator light projected from the indicator light projector of the controlled apparatus is light in a wavelength region substantially within an invisible region, transmission and reception of information between the controlled apparatus and the control apparatus are never perceived by the user of the control system. Accordingly, there is no potential to cause any discomfort to the user even during a period in which the controlled apparatus adjusts its operation mode while transmitting and receiving information between the apparatuses.

(3) A control apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus includes an indicator light receiver that receives the indicator light emitted from the indicator light projector of the controlled apparatus, a response signal forming unit that forms a response signal on which the controlled apparatus relies for recognizing the relative position between the controlled apparatus and the control apparatus based on the indicator light received by the indicator light receiver, and a response signal transmitter that transmits the response signal formed by the response signal forming unit toward the response signal receiver of the controlled apparatus.

According to the control apparatus of the above (3), since the indicator light projection with relatively high power consumption is performed at the controlled apparatus side, power saving can be realized at the control apparatus side that often adopts a form as a remote operating using a battery as a power supply and used by being placed on user's hand. Further, since the apparatus has a configuration to accommodate light in a wavelength region substantially within an invisible region as the indicator light projected from the indicator light projector of the controlled apparatus, transmission and reception of information between the controlled apparatus and the control apparatus are never perceived by the user of the control system. Accordingly, there is no potential to cause any discomfort to the user even during a period in which the controlled apparatus adjusts its operation mode while transmitting and receiving information between the apparatuses.

(4) The control system according to (1), wherein the indicator light projector of the controlled apparatus includes plural light emitting elements having different light emission directivity directions and is configured to sequentially switch the plural light emitting elements over time and allow the elements to emit light.

According to the control system of the above (4), in addition to the operation in the control system of the above (1), the indicator light projector can be formed as a static mechanism with no mechanically movable part, generates no noise or vibration, and further, has no potential of wear and advantageous durability.

(5) The controlled apparatus according to (2), wherein the indicator light projector includes plural light emitting elements having different light emission directivity directions and is configured to sequentially switch the plural light emitting elements over time and allow the elements to emit light.

According to the controlled apparatus of the above (5), in addition to the operation in the controlled apparatus of the above (2), the indicator light projector can be formed as a static mechanism with no mechanically movable part, generates no noise or vibration, and further, has no potential of wear and advantageous durability.

(6) The control system according to (1), wherein the indicator light projector of the controlled apparatus includes a single light emitting element having a directivity and is configured to rotate the single light emitting element at a constant speed and allow the element to emit light.

According to the control system of the above (6), in addition to the operation in the control system of the above (1), the indicator light can be projected over a broader range of angle by the single light emitting element and a relatively simple drive circuit.

(7) The controlled apparatus according to (2), wherein the indicator light projector includes a single light emitting element having a directivity and is configured to rotate the single light emitting element at a constant speed and allow the element to emit light.

According to the controlled apparatus of the above (7), in addition to the operation in the controlled apparatus of the above (2), the indicator light can be projected over a broader range of angle by the single light emitting element and a relatively simple drive circuit.

(8) The control system according to (1), wherein the response signal forming unit of the control apparatus has a time interval measurement unit that obtains a signal corresponding to a time interval between peaks with respect to a level change of the indicator light received by the indicator light receiver and is configured to output an output of the time interval measurement unit as the response signal, and the relative position recognizer of the controlled apparatus includes a relative position computer that determines the relative position of the control apparatus to the housing of the controlled apparatus based on a value of the time interval between peaks represented by the response signal from the control apparatus.

According to the control system of the above (8), in addition to the operation in the control system of the above (1), since the processing at the control apparatus side is relatively minor one only for obtaining a signal corresponding to the time interval between peaks with respect to a level change of the indicator light received by the indicator light projector, the load on the control apparatus side is relatively light and the apparatus can be formed as relatively small one. Further, at the controlled apparatus side, the increase in the load corresponding to the decrease in the load at the control apparatus side can be sufficiently absorbed.

(9) The control apparatus according to (3), wherein the response signal forming unit has a time interval measurement unit that obtains a signal corresponding to a time interval between peaks with respect to a level change of the indicator light received by the indicator light receiver and is configured to output an output of the time interval measurement unit as the response signal.

According to the control apparatus of the above (9), in addition to the operation in the control apparatus of the above (3), since the apparatus covers the relatively minor processing only for obtaining a signal corresponding to the time interval between adjacent peaks with respect to level change of the indicator light received by the indicator light projector, the load on the control apparatus side is relatively light and the apparatus can be formed as relatively small one.

(10) The controlled apparatus according to (2), wherein the relative position recognizer includes a relative position computer that determines the relative position of the control apparatus to the housing of the controlled apparatus based on a value of the time interval between peaks represented by the response signal from the control apparatus.

According to the controlled apparatus of the above (10), in addition to the operation in the controlled apparatus of the above (2), while the control apparatus corresponding to itself can be formed as a small one with reduced load thereon, the increase in the load corresponding to the decrease in the load at the control apparatus side can be sufficiently absorbed.

(11) The control system according to (1), wherein the response signal forming unit of the control apparatus has a time interval measurement unit that obtains a signal corresponding to a time interval between peaks with respect to a level change of the indicator light received by the indicator light receiver and a relative position calculator that calculates the relative position of the control apparatus to the housing of the controlled apparatus based on an output of the time interval measurement unit, and is configured to output an output of the relative position calculator as the response signal.

According to the control system of the above (11), in addition to the operation in the control system of the above (1), since the system is not only to obtain a signal corresponding to the time interval between peaks with respect to the level change of the indicator light received by the indicator light receiver at the control apparatus side, but also to cover the processing of calculating the relative position of the control apparatus to the housing of the controlled apparatus based on the signal corresponding to the time interval, in the case where there is plenty of room for capacity of the signal processing circuit applied to the control apparatus side, the capacity can be sufficiently and effectively utilized and the information representing the above described relative position can be received at the controlled apparatus side from the control apparatus side. Accordingly, an apparatus advantageous in responsiveness that does not wait the computation of the relative position can be configured by a simple structure.

(12) The control apparatus according to (3), wherein the response signal forming unit has a time interval measurement unit that obtains a signal corresponding to a time interval between peaks with respect to a level change of the indicator light received by the indicator light receiver and a relative position calculator that calculates the relative position of the control apparatus to the housing of the controlled apparatus based on an output of the time interval measurement unit, and is configured to output an output of the relative position calculator as the response signal.

According to the control apparatus of the above (12), in addition to the operation in the control apparatus of the above (3), since the apparatus is to cover the processing of calculating the relative position of the control apparatus to the housing of the controlled apparatus at the side of itself not by the controlled apparatus, in the case where there is plenty of room for capacity of the signal processing circuit applied to the control apparatus side, the capacity can be sufficiently and effectively utilized and the controlled apparatus can be configured by a simple structure and advantageous in responsiveness.

(13) The controlled apparatus according to (2), wherein the relative position recognizer is configured to recognize the relative position of the control apparatus to the housing of the controlled apparatus based on information of the relative position of the control apparatus to the housing of the controlled apparatus represented by the response signal from the control apparatus.

According to the controlled apparatus of the above (13), in addition to the operation in the controlled apparatus of the above (2), since the above described information representing the relative position can be received from the control apparatus side, an apparatus advantageous in responsiveness that does not wait the computation of the relative position can be configured by a simple structure.

(14) The control system according to (1) or (4), wherein the indicator light projector of the controlled apparatus includes plural light emitting elements having different light emission directivity directions and is configured to perform light emission operation including both switching light emission operations of forward switching light emission operation from one end side of an arrangement of the plural light emitting elements to the other end side and backward switching light emission operation from the other end side to the one end side when sequentially switching the plural light emitting elements over time and allowing the elements to emit light.

According to the control system of the above (14), in addition to the operation in the control system of the above (1) or (4), the information based on which the relative position of the control apparatus to the housing of the controlled apparatus is determined can be obtained without the need of any separate projector of indicator light representing a specified reference position.

(15) The controlled apparatus according to (2) or (5), wherein the indicator light projector includes plural light emitting elements having different light emission directivity directions and is configured to perform light emission operation including both switching light emission operations of forward switching light emission operation from one end side an arrangement of the plural light emitting elements to the other end side and backward switching light emission operation from the other end side to the one end side when sequentially switching the plural light emitting elements over time and allowing the elements to emit light.

According to the controlled apparatus of the above (15), in addition to the operation in the controlled apparatus of the above (2) or (5), the information based on which the relative position of the control apparatus to the housing of the controlled apparatus is determined can be obtained without the need of any separate projector of indicator light representing a specified reference position.

(16) The control system according to (1), wherein the indicator light projector of the controlled apparatus includes plural light emitting elements having different light emission directivity directions and is configured to initially allow two or more of the plural light emitting elements to simultaneously emit light and, after the simultaneous light emission, sequentially switch and allow the elements to emit light.

According to the control system of the above (16), in addition to the operation in the control system of the above (1), the information based on which the relative position of the control apparatus to the housing of the controlled apparatus is determined can be obtained without the need of any separate projector of indicator light representing a specified reference position.

(17) The controlled apparatus according to (2), wherein the indicator light projector includes plural light emitting elements having different light emission directivity directions and is configured to initially allow two or more of the plural light emitting elements to simultaneously emit light and, after the simultaneous light emission, sequentially switch and allow the elements to emit light.

According to the controlled apparatus of the above (17), in addition to the operation in the controlled apparatus of the above (2), the information based on which the relative position of the control apparatus to the housing of the controlled apparatus is determined can be obtained without the need of any separate projector of indicator light representing a specified reference position.

(18) The control system according to (1), wherein the response signal forming unit of the control apparatus has a time interval measurement unit that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, detects a light reception level of the indictor light by the simultaneous light emission received by the indicator light receiver as a first peak, detects a peak of a light reception level detected next to the first peak as a second peak, and obtains a signal corresponding to a time interval between the first peak and the second peak, and is configured to output an output of the time interval measurement unit as the response signal, and the relative position recognizer of the controlled apparatus includes a relative position computer that determines the relative position of the control apparatus to the housing of the controlled apparatus based on a value of the time interval between the first peak and the second peak represented by the response signal from the control apparatus.

According to the control system of the above (18), in addition to the operation in the control system of the above (1), the information based on which the relative position of the control apparatus to the housing of the controlled apparatus is determined can be obtained without the need of any separate projector of indicator light representing a specified reference position.

(19) The control apparatus according to (3), wherein the response signal forming unit has a time interval measurement unit that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, detects a light reception level of the indictor light by the simultaneous light emission received by the indicator light receiver as a first peak, detects a peak of a light reception level detected next to the first peak as a second peak, and obtains a signal corresponding to a time interval between the first peak and the second peak, and is configured to output an output of the time interval measurement unit as the response signal.

According to the control apparatus of the above (19), in addition to the operation in the control apparatus of the above (1), the information based on which the relative position of the control apparatus to the housing of the controlled apparatus is determined can be obtained without the need of any separate projector of indicator light representing a specified reference position.

(20) The controlled apparatus according to (2), wherein the relative position recognizer includes a relative position computer that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, receives the response signal obtained by detecting a light reception level of the indictor light by the simultaneous light emission as a first peak, detecting a peak of a light reception level detected next to the first peak as a second peak, and generating a signal corresponding to a time interval between the first peak and the second peak, and determines the relative position of the control apparatus to the housing of the controlled apparatus based on a value of the response signal.

According to the controlled apparatus of the above (20), in addition to the operation in the controlled apparatus of the above (1), the information based on which the relative position of the control apparatus to the housing of the controlled apparatus is determined can be obtained without the need of separate projector of indicator light representing a specified reference position.

(21) The control system according to (8), wherein the time interval measurement unit in the response signal forming unit of the control apparatus is configured, with respect to an output of a smoothing unit that performs smoothing processing to the level change of the indicator light received by the indicator light receiver, to obtain a signal corresponding to a time interval between peaks according to a change over time of the output.

According to the control system of the above (21), in addition to the operation in the control system of the above (8), information can be obtained for recognizing the relative position of the control apparatus relative to the housing of the controlled apparatus with precision exceeding the resolution with respect to the change over time of the directivity directions of the light emission in the indicator light projector of the controlled apparatus.

(22) The control apparatus according to (9), wherein the time interval measurement unit is configured, with respect to an output of a smoothing unit that performs smoothing processing to the level change of the indicator light received by the indicator light receiver, to obtain a signal corresponding to a time interval between peaks according to a change over time of the output.

According to the control apparatus of the above (22), in addition to the operation in the control apparatus of the above (9), information can be obtained for recognizing the relative position of the control apparatus relative to the housing of the controlled apparatus with precision exceeding the resolution with respect to the change over time of the directivity directions of the light emission in the indicator light projector of the controlled apparatus.

(23) The control system according to (11), wherein the time interval measurement unit in the response signal forming unit of the control apparatus is configured, with respect to an output of a smoothing unit that performs smoothing processing to the level change of the indicator light received by the indicator light receiver, to obtain a signal corresponding to a time interval between peaks according to a change over time of the output.

According to the control system of the above (23), in addition to the operation in the control system of the above (11), information can be obtained for recognizing the relative position of the control apparatus relative to the housing of the controlled apparatus with precision exceeding the resolution with respect to the change over time of the directivity directions of the light emission in the indicator light projector of the controlled apparatus.

(24) The control apparatus according to (12), wherein the time interval measurement unit is configured, with respect to an output of a smoothing unit that performs smoothing processing to the level change of the indicator light received by the indicator light receiver, to obtain a signal corresponding to a time interval between peaks according to a change over time of the output.

According to the control apparatus of the above (24), in addition to the operation in the control apparatus of the above (12), information can be obtained for recognizing the relative position of the control apparatus relative to the housing of the controlled apparatus with precision exceeding the resolution with respect to the change over time of the directivity directions of the light emission in the indicator light projector of the controlled apparatus.

(25) The control system according to (18), wherein the time interval measurement unit in the response signal forming unit of the control apparatus is configured, with respect to an output of a smoothing unit that performs smoothing processing to the level change of the indicator light received by the indicator light receiver, to obtain a signal corresponding to a time interval between peaks according to a change over time of the output.

According to the control system of the above (25), in addition to the operation in the control system of the above (18), information can be obtained for recognizing the relative position of the control apparatus relative to the housing of the controlled apparatus with precision exceeding the resolution with respect to the change over time of the directivity directions of the light emission in the indicator light projector of the controlled apparatus.

(26) The control apparatus according to (19), wherein the time interval measurement unit is configured, with respect to an output of a smoothing unit that performs smoothing processing to the level change of the indicator light received by the indicator light receiver, to obtain a signal corresponding to a time interval between peaks according to a change over time of the output.

According to the control apparatus of the above (26), in addition to the operation in the control apparatus of the above (19), information can be obtained for recognizing the relative position of the control apparatus relative to the housing of the controlled apparatus with precision exceeding the resolution with respect to the change over time of the directivity directions of the light emission in the indicator light projector of the controlled apparatus.

(27) The control system according to (1), wherein the controlled apparatus further has an image display unit in which an aspect ratio of an effective display screen can be varied based on an output of the adjuster.

According to the control system of the above (27), in addition to the operation in the control system of the above (1), screen display advantageous in visibility can be performed on the display unit of the controlled apparatus according to the relative position of the control apparatus to the housing of the controlled apparatus.

(28) The controlled apparatus according to (2), further has an image display unit in which an aspect ratio of an effective display screen can be varied based on an output of the adjuster.

According to the controlled apparatus of the above (28), in addition to the operation in the controlled apparatus of the above (2), screen display advantageous in visibility can be performed on the display unit of itself according to the relative position of the control apparatus to the housing of the controlled apparatus.

(29) The control system according to (1), wherein the controlled apparatus further has a sound emitter in which sound effect can be varied based on an output of the adjuster.

According to the control system of the above (29), in addition to the operation in the control system of the above (1), sound emission advantageous in acoustic effect can be performed in the sound emitter of the controlled apparatus according to the relative position of the control apparatus to the housing of the controlled apparatus.

(30) The controlled apparatus according to (2), further has a sound emitter in which sound effect can be varied based on an output of the adjuster.

According to the control apparatus of the above (30), in addition to the operation in the control apparatus of the above (2), sound emission advantageous in acoustic effect can be performed in the sound emitter of itself according to the relative position of the control apparatus to the housing of the controlled apparatus.

(31) The control system according to (1), wherein the indicator light projector of the controlled apparatus is configured to be activated in response to an activation command from the control apparatus and start the projection of the indicator light.

According to the control system of the above (31), in addition to the operation in the control system of the above (1), since the projector is activated in response to the activation command from the control apparatus that is consciously operated by the user and starts the projection of the indicator light from the controlled apparatus, the wasted power consumption at the time of nonuse can be suppressed.

(32) The controlled apparatus according to (2), wherein the indicator light projector is configured to be activated in response to an activation command from the control apparatus and start the projection of the indicator light.

According to the controlled apparatus of the above (32), in addition to the operation in the controlled apparatus of the above (3), since the projector is activated in response to the activation command from the control apparatus that is consciously operated by the user and starts the projection of the indicator light from the controlled apparatus, the wasted power consumption at the time of nonuse can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
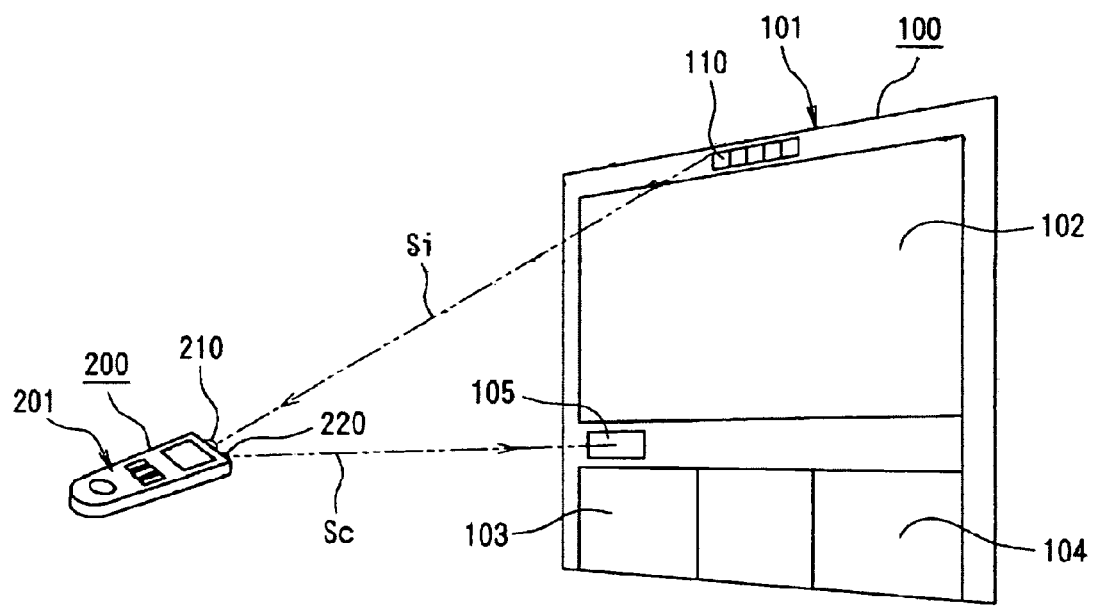
FIG. 1 is a conceptual diagram illustrating a control system as an embodiment of the invention.

Hereinafter, embodiments of the invention will be described by referring to the drawings. In the drawings referred to as below, for convenience, substantial parts as a subject of description will be appropriately exaggerated and parts other than the substantial parts will be appropriately simplified or omitted.

FIG. 1 is a conceptual diagram illustrating a control system (a liquid crystal projection television receiver system) as an embodiment of the invention including a controlled apparatus (a liquid crystal projection television main body) and a control apparatus (a remote corresponding to the liquid crystal projection television main body). In FIG. 1, a liquid crystal projection television main body as the controlled apparatus (hereinafter, referred to as "liquid crystal projection television") 100 is arranged so as to receive control signals from a remote 200 as the control apparatus corresponding thereto through infrared light or the like, and thereby, the operation thereof can be controlled.

The liquid crystal projection television 100 includes, in a housing 101 thereof, a screen 102 for displaying a video, a left speaker 103 and a right speaker 104 that form a stereo sound device at the lower position than the bottom side of the screen 102, a light receiving window 105 for receiving control signal SC of infrared light or the like from the remote 200 immediately below the bottom side of the screen 102, and an indicator light projection part 110 that forms an indicator light projector including plural light emitting elements such as infrared LEDs or the like arranged for projecting indicator light having a directivity of light in a wavelength region within a substantially invisible region such as infrared light or the like, as will be described later, onto a position immediately above the center of the upper side of the screen 102 so that the exiting direction of the light may change over time with a known regularity.

On the other hand, the remote 200 has an independent casing 201 that can be located in a position distant from the liquid crystal projection television 100 (the housing 101 thereof), in which an indicator light reception part 210 that forms an indicator light receiver for receiving indicator light Si emitted from the indicator light projection part 110 of the liquid crystal projection television 100 and a control signal projection part 220 including plural light emitting elements such as infrared LEDs or the like for emitting the control signal Sc to the liquid crystal projection television 100 are provided.

Thus, the control system (liquid crystal projection television receiver system) 100+200 of the invention is configured by including the above described liquid crystal projection television 100 and remote 200. Note that the control signal Sc of infrared light or the like includes a response signal, which will be described later, to be emitted in response to the reception of the indicator light Si emitted from the indicator light projection part 110 of the liquid crystal projection television 100 other than the signals for controlling the liquid crystal projection television 100 according to the arbitrary operation of an operator.

Figure 2:
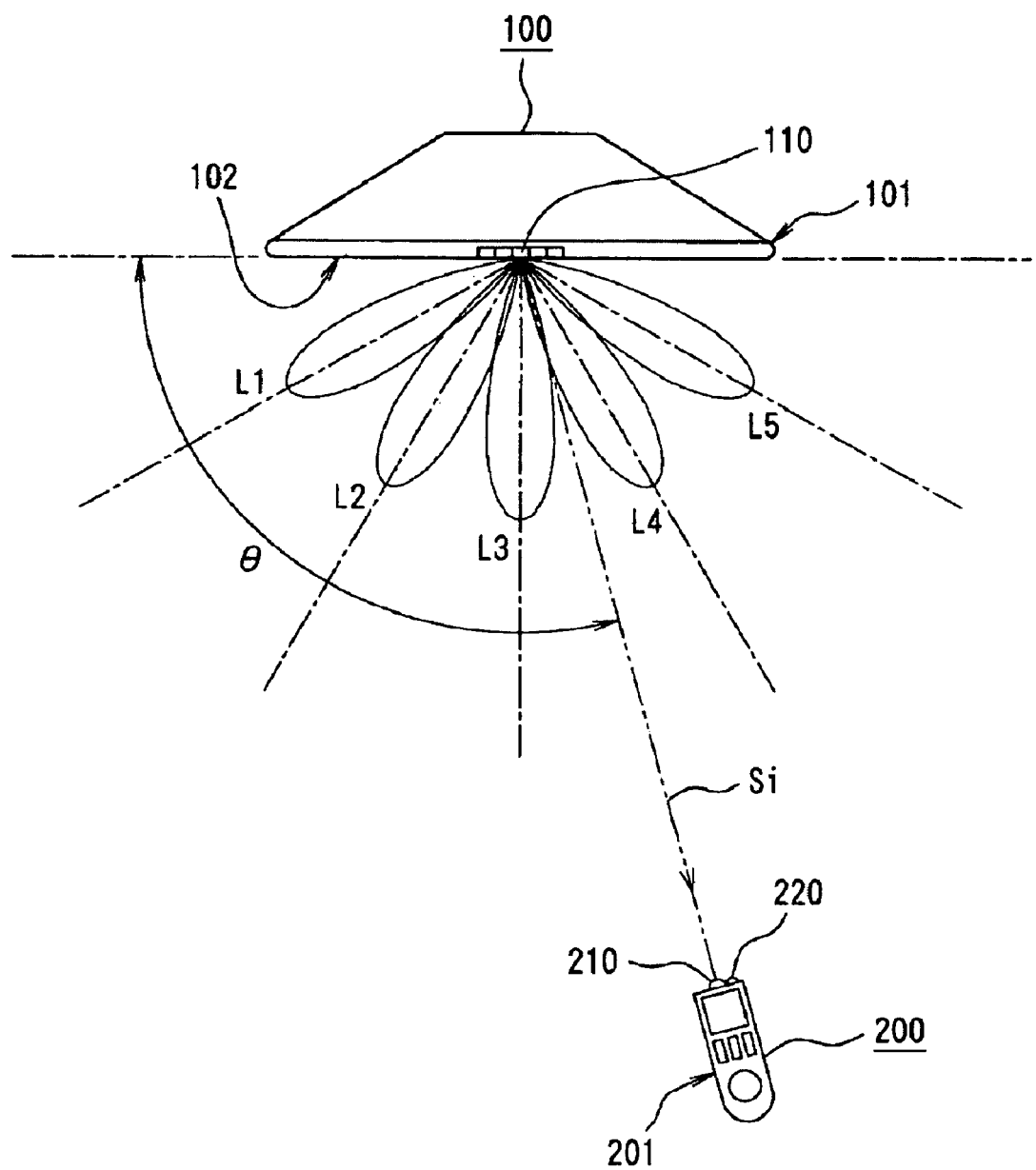
FIG. 2 is a conceptual plan view for explanation of an operation of the control system in FIG. 1.

FIG. 2 is a conceptual plan view for explanation of an operation of the control system (100+200) in FIG. 1. In FIG. 2, the corresponding parts to those in the above described FIG. 1 are shown by the same signs. In this example, the indicator light projection part 110 is formed by arranging light emitting elements such as five infrared LEDs different in directivity directions when projecting indicator light. The number of light emitting elements is for illustrative purpose and an appropriate number can be selected according to the required specification.

As shown in the drawing, the directivities of the five light emitting elements are set to five directions of L1, L2, L3, L4, and L5 at intervals of 30 degrees with a direction along the display surface of the screen 102 as 0 degrees (to 180 degrees) in a counter-clockwise direction seen in the plan projection as in FIG. 2. FIG. 2 shows the case where the remote 200 (i.e, a viewer with the remote) is located in a direction between L3 and L4 (at angle θ from the direction along the display surface of the screen 102) relative to the above set directivities, and the indicator light reception part 220 of the liquid crystal projection television 100 receives indicator light Si emitted from the indicator light projection part 110.

Figure 3:
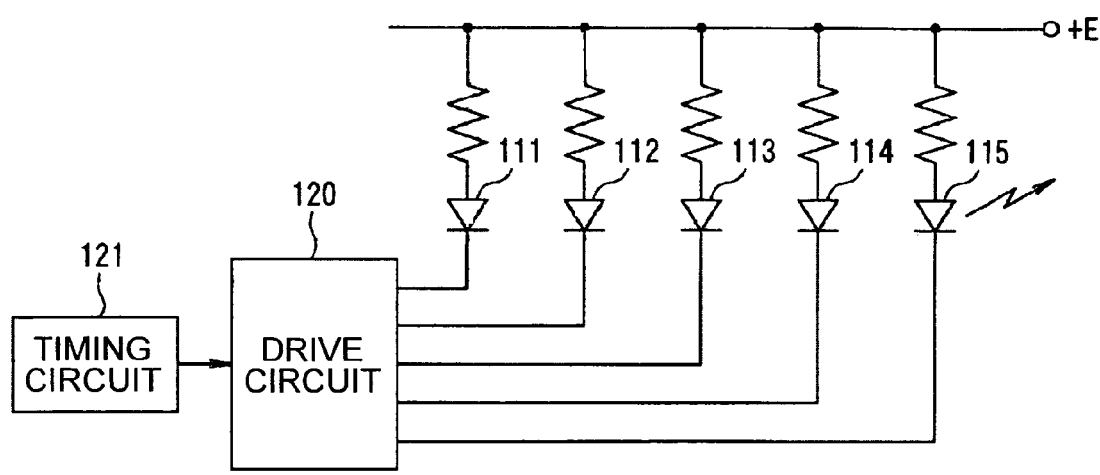
FIG. 3 is a block diagram showing a circuitry of an indicator light projection part of a liquid crystal projection television.

FIG. 3 is a block diagram showing a circuitry of the indicator light projection part 110 of the liquid crystal projection television 100. In FIG. 3, anode sides of five infrared LEDs 111, 112, 113, 114, and 115 respectively corresponding to the above described directivities L1, L2, L3, L4, and L5 in FIG. 2 are connected to positive power supply +E via pull-up resistors, respectively, and cathode sides of the five infrared LEDs 111, 112, 113, 114, and 115 are connected to a drive circuit 120. The drive circuit 120 sequentially switches the respective LEDs 111, 112, 113, 114, and 115 over time with a known regularity such as a fixed period, for example, and allows them to emit light.

In the control system (100+200) as described by referring to FIGS. 2 and 3, since the indicator light projection part 110 as the indicator light projector of the liquid crystal projection television 100 includes plural light receiving elements having different directivities of light emission and is configured to sequentially switch and allow the plural light receiving elements to emit light over time, the indicator light projector is formed as a static mechanism with no mechanically movable part, generates no noise or vibration, and further, has no potential of wear and advantageous durability.

Omitted to be shown, a configuration in which a single light emitting element having a directivity is provided as the indicator light projector at the liquid crystal projection television 100 side, and the single light emitting element is rotatably supported and allowed to swing and emit light by a motor or the like so that the swing speed may be constant in a rotation range in which the indicator light is effectively projected or a rotation range in which the projected light is effectively detected may be adopted. Further, the element can be configured so as to emit light while being swung in a reciprocate manner by a motor or the like via a displacement conversion mechanism for converting the rotation movement into reciprocation swing movement as a publicly known oscillation mechanism. In this case, since the speed in the circumferential direction in the reciprocation swing movement differs depending on a position (rotation angle), the emission timing of the light emitting element is selected in consideration of the point, and the point is taken into consideration for computation of position detection of the remote, which will be described later by referring to FIG. 6. By the configuration, the indicator light can be projected over a broader range of angle by a single light emitting element and the relatively simple drive circuit.

Figure 4:
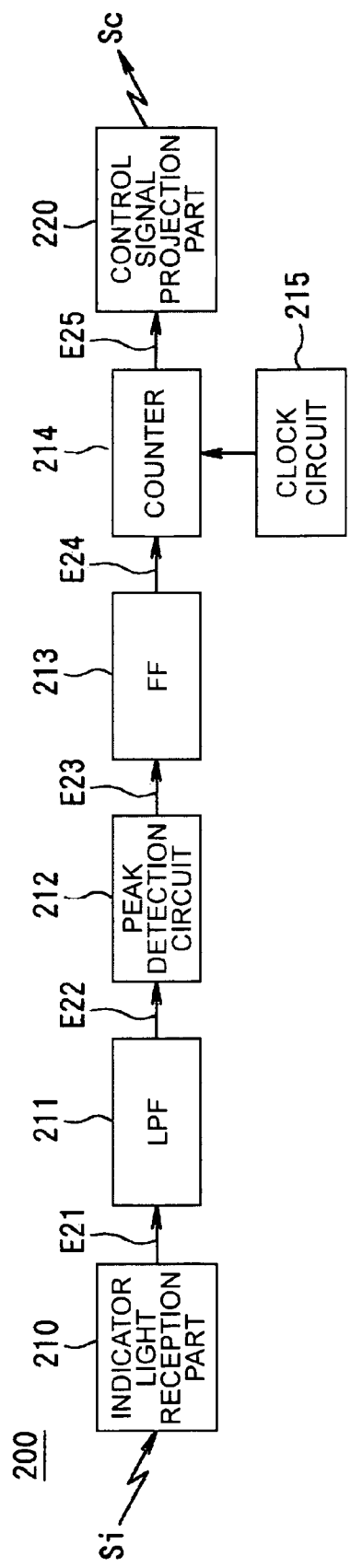
FIG. 4 is a block diagram showing a circuitry of a remote.

FIG. 4 is a block diagram showing a circuitry of the remote 200. In FIG. 4, the indicator light Si reception part 210 receives the indicator light emitted from the indicator light projection part 110 of the liquid crystal projection television 100 and outputs light reception level signal E21 corresponding to the intensity of the received light. The light reception level signal E21 is smoothed through a low-pass filter (LPF) 211 and output as smoothed signal E22.

The peaks of the smoothed signals E22 are sequentially detected by a peak detection circuit 212 in the next stage, and peak detection signals E23 are output and the peak detection signals E23 are supplied to a flip-flop (FF) circuit 213. The flip-flop (FF) circuit 213 supplies an output signal E24 that holds time interval H-level of adjacent two peak detection signals E23 to a counter 214.

The counter 214 counts clock signals supplied from a clock circuit 215 over the time interval where the output signals are at H-level, and supplies time interval signals E25 representing times between peaks as a counting result to a control signal projection part 220. The control signal projection part 220 projects the control signal Sc of infrared light or the like corresponding to the time interval signals E25 toward the liquid crystal projection television 100 (light receiving window 105).

In the above description, the low-pass filter (LPF) 211, the peak detection circuit 212, the flip-flop (FF) circuit 213, the counter 214, and the clock circuit 215 correspond to a response signal forming unit for forming response signals (time interval signals E25) on which relative position recognizer (microprocessor 132, which will be described later) relies for recognizing the relative position of the liquid crystal projection television 100 as the controlled apparatus based on the indicator light received by the indicator light reception part 210 as the indicator light receiver. The response signals (E25) are converted into control signals Sc of infrared light or the like by the control signal projection part 220 as a response signal transmitter and transmitted toward the light receiving elements 131 as a response signal receiver of the liquid crystal projection television 100 as the controlled apparatus.

Figure 5:
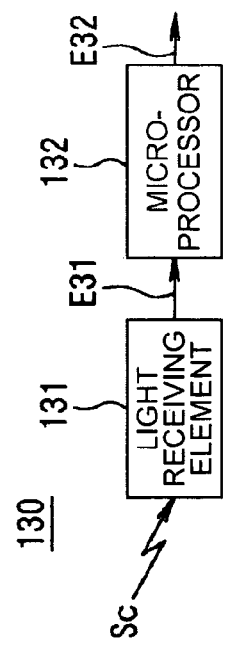
FIG. 5 is a block diagram showing a circuitry of a control signal reception part of the liquid crystal projection television.

FIG. 5 is a block diagram showing a circuitry of a control signal reception part 130 provided at the back of the light receiving window 105 of the liquid crystal projection television 100. In FIG. 5, the control signal reception part 130 is provided with a light receiving element 131 for detecting control signal Sc of infrared light or the like from the remote 200 in the position of the light receiving window 105. In the example, detection output signal E31 by the light receiving element corresponds to the above described time interval signal E25 in FIG. 4.

The detection output signal E31 is supplied to a microprocessor 132 in the next stage. The microprocessor 132 converts information of time intervals of the above described detection output signals E31 into information representing the relative position of the remote 200 to the liquid crystal projection television 100 and outputs relative position signal E32 representing the information.

Figure 6:
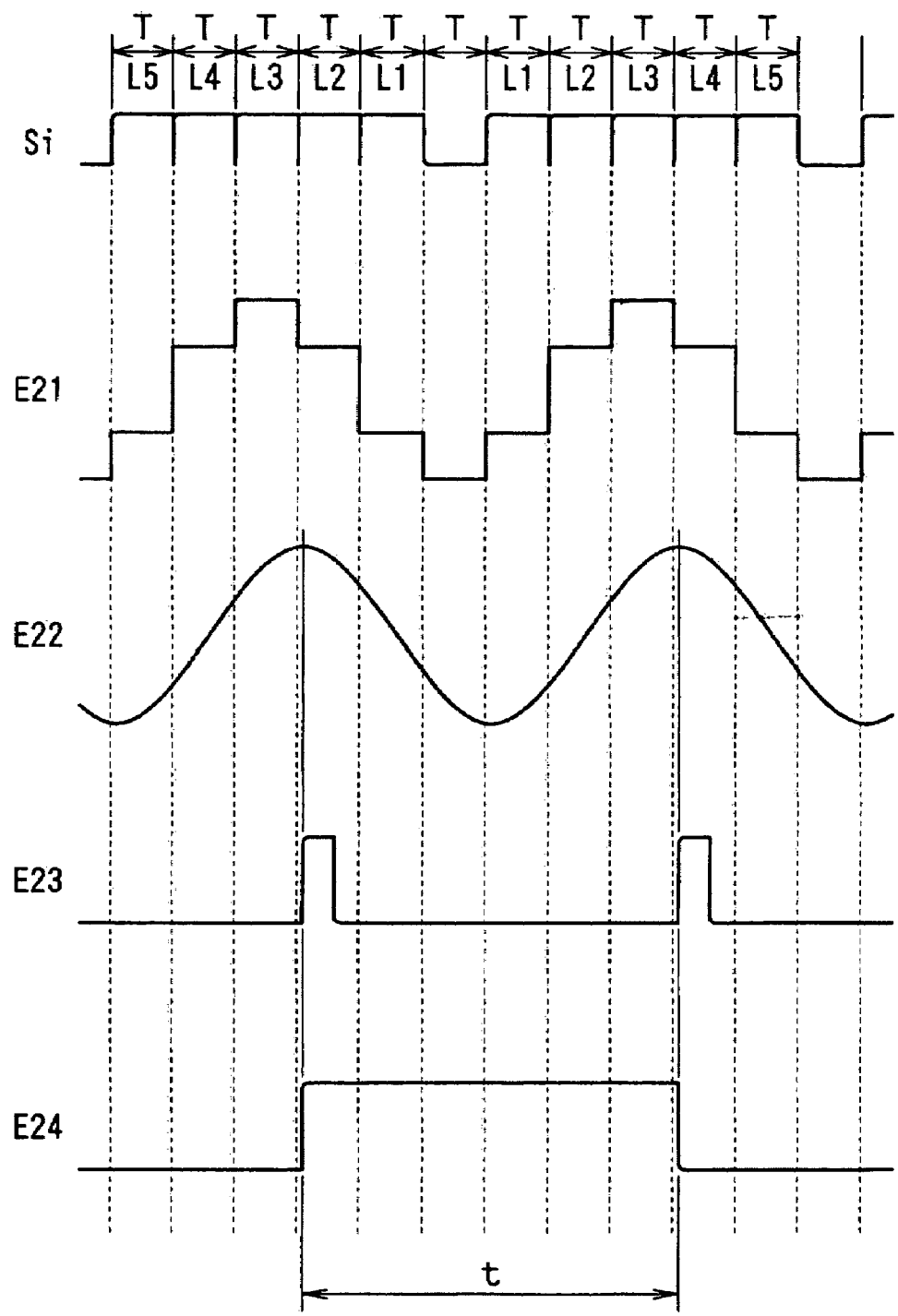
FIG. 6 is a timing chart for explanation of a state of projection of indicator light from the indicator light projection part of the liquid crystal projection television.

FIG. 6 is a timing chart for explanation of a state of projection of indicator light Si from the indicator light projection part 110 of the liquid crystal projection television 100 and an operation of the remote 200 that has received the indicator light Si. The respective signals in FIG. 6 are shown by common signs as described above in FIG. 4. The indicator light Si from the indicator light projection part 110 of the liquid crystal projection television 100 is emitted by sequentially switching and allowing the respective infrared LEDs 111, 112, 113, 114, and 115 of the indicator light projection part 110 having the respective emission directivities L1, L2, L3, L4, and L5 that have been described by referring to FIG. 2 to emit light in the reverse order in the directivities of directivities L5→L4→L3→L2→L1, respectively, with period T, and then, after a period of rest for the same time as T in which all infrared LEDs are turned off, allowing the elements to emit light in the order of L1→L2→L3→L4→L5.

That is, assuming that the infrared LED 115 with directivity L5 is located at one end side and the infrared LED 111 with directivity L1 is located at the other end side, when the plural light emitting elements 111, 112, 113, 114, and 115 are sequentially switched and allowed to emit light over time, light emission operation including both switching light emission operations of forward switching light emission operation from the one end side to the other end side and backward switching light emission operation from the other end side to the one end side is performed.

It is assumed that the position of the remote 200 (i.e., position of the indicator light reception part 210) is located in a position of a viewer as a user thereof or a statistic position nearby, while the infrared LEDs having different directivities are thus sequentially switched and allowed to emit light. Accordingly, when the respective infrared LEDs sequentially emit light as described above, the intensity of light reception in the indicator light reception part 210 of the remote 200 is relatively stronger as the directivity of the indicator light is nearer the position of the indicator light reception part 210 and relatively weaker, the farther, and exhibits the change as shown by the reception light level signal E21 in FIG. 6.

The signal E21 is smoothed through the low-pass filter (LPF) 211 as described above in FIG. 4, and thereby, smoothed signal E22 in the shape as shown in FIG. 6 is formed. The peaks of the smoothed signals E22 are sequentially detected by the peak detection circuit 212 in FIG. 4 and peak detection signals E23 are output. That is, the peak detection signals E23 as pulse signals generated when the time points where the rate of change shifts from positive to negative as peak positions of the smoothed signals E22 are picked up are output.

Since the signals corresponding to the time intervals between peaks according to the change over time are obtained by thus performing smoothing processing on the change of the light reception levels of the indicator light, information can be obtained for recognizing the relative position of the remote as the control apparatus to the housing of the liquid crystal projection television as the controlled apparatus with precision exceeding the resolution with respect to the change over time of the directivity directions of the light emission in the indicator light projector.

As clearly seen by referring to FIG. 6, the intervals of pulses (the respective rising edges thereof) of the peak detection signals E23 correspond to time intervals between peaks with respect to the level change of the indicator light received by the indicator light receiver. The flip-flop (FF) circuit 213 in FIG. 4 that has been supplied with the peak detection signals E23 supplies an output signal E24 that holds H-level over time interval t of adjacent two peak detection signals E23 to the counter 214.

As readily understood by referring to FIG. 6, when both switching light emission operations of forward switching light emission operation from the one end side to the other end side in the arrangement of light emitting elements and backward switching light emission operation from the other end side to the one end side are performed, with respect to the light emission directivity direction L1 by the infrared LED 111, the time interval t between the center of the corresponding light reception level section (L1) at the time of forward switching light emission operation and the center of the corresponding light reception level section. (L1) at the time of backward switching light emission operation is 2T.

Similarly, with respect to the emission directivity direction L5 by the infrared LED 115, the time interval t between the center of the corresponding light reception level section (L5) at the time of forward switching light emission operation and the center of the corresponding light reception level section (L5) at the time of backward switching light emission operation is 10T. Thus, when the time interval t is 2T, the position of the remote 200 (i.e., the position of the indicator light reception part 210) is located in the directivity direction L1, and, when the time interval t is 10T, the position of the remote 200 (i.e., the position of the indicator light reception part 210) is located in the directivity direction L5.

When the above condition is generalized, when the time interval between adjacent peaks with respect to the smoothed signals E22 is t, the angle of the direction of the remote 200 (θ in FIG. 2) can be obtained as (t/2T)×30°. Since the reception light level signal E21 in FIG. 6 is smoothed through the low-pass filter (LPF) 211 as described above in FIG. 4, the absolute position of the peak is delayed depending on the time constant according to the smoothing, however, the time interval t between adjacent peaks is not affected.

As described above, according to the projection of the indicator light Si from the indicator light projection part 110 of the liquid crystal projection television 100 as the controlled apparatus, since the both switching light emission operations of forward switching light emission operation from the one end side to the other end side in the arrangement of plural light emitting elements and backward switching light emission operation from the other end side to the one end side are performed when the plural light emitting elements having different emission directivities are sequentially switched and allowed to emit light over time, the information based on which the relative position of the control apparatus (remote) to the housing of the controlled apparatus is determined can be obtained without the need of any separate projector of indicator light representing a specified reference position.

Further, since the peaks are sequentially detected with respect to the smoothed signals E22 formed by smoothing the signals E21 through the low-pass filter (LPF) 211 with the light reception levels changing in incremental steps corresponding to the direction (position) of the remote 200, even when the direction (position) of the remote 200 is located between two directivity directions (L3, L4) as shown in FIG. 2, for example, the time interval t can be obtained by sequentially detecting peaks with respect to the smoothed signals E22. The microprocessor 132 in FIG. 5 converts information of the above described time intervals t transmitted as control signals Sc of infrared light or the like into information representing the position of the remote 200.

According to the control system (100+200) as has been described by referring to FIGS. 1 to 6, since the processing at the remote 200 side as the control apparatus is relatively minor one only for obtaining signals corresponding to the time interval between adjacent peaks with respect to level change of the indicator light received by the indicator light projector, the load on the remote 200 is relatively light and the remote can be formed as relatively small one. Further, since the power supply capacity is plenty as a commercial power supply or the like can be used at the liquid crystal projection television 100 side, there is little difficulty in upsizing the circuit, and the increase in the load corresponding to the decrease in the load at the control apparatus side can be sufficiently absorbed.

Figure 7:
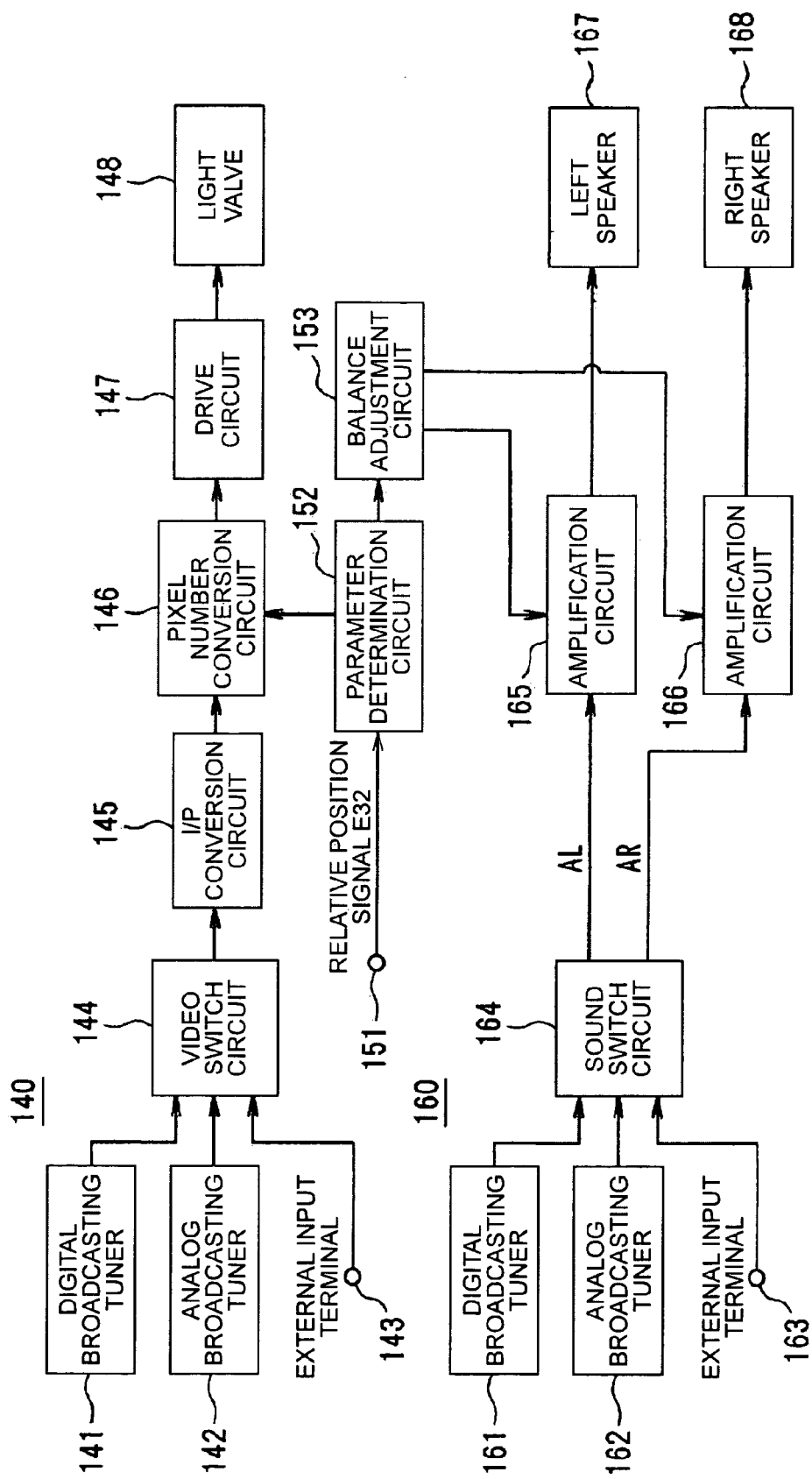
FIG. 7 is a block diagram showing a circuitry of the liquid crystal projection television in the control system in FIG. 1.

FIG. 7 is a block diagram showing a circuitry of the liquid crystal projection television 100 in FIG. 1. In FIG. 7, a digital broadcasting tuner 141, an analog broadcasting tuner 142, and an external input terminal 143 of a video system circuit 140 are connected so as to be switching-selected by a video switch circuit 144. The output signal of the video switch circuit 144 becomes a signal having an aspect ratio of a displayed video converted through an I/P conversion circuit 145 for sequentially converting interlace scan signals into scan signals and a pixel number conversion circuit 146 in the next stage, and the signal is power amplified by a drive circuit 147 to drive a light valve 148 and a video is displayed on the screen 102 shown in FIG. 1.

From a relative position signal input terminal 151 receiving the relative position signal E32 representing the relative position between the microprocessor 132 and the remote 200 as has been described by referring to FIG. 5, the relative position signal E32 is supplied to a parameter determination circuit 152, and the parameter determination circuit 152 provides a command for obtaining an appropriate aspect ratio of video display corresponding to the position of the remote 200 to the pixel number conversion circuit 146 based on the supplied relative position signal E32.

On the other hand, in a sound system circuit 160, a digital broadcasting tuner 161, an analog broadcasting tuner 162, and an external input terminal 163 are connected so as to be switching-selected by a video switch circuit 164. The output signals of left sound signal LA and right sound signal RA as outputs of the video switch circuit 164 drive a left speaker 167 and a right speaker 168 through correspondingly provided amplification circuit 165 and amplification circuit 166, respectively.

In the above described sound system circuit 160, the respective drive circuit 165 (left) and drive circuit 166 (right) are provided with control signals from a balance adjustment circuit 153 for generating control signals for balance adjustment of volumes of the left and right speakers in response to the command from the above described parameter determination circuit 152, and thereby, those amplification factors are adjusted. The left speaker 167 and the right speaker 168 correspond to the left speaker 103 and the right speaker 104 of the liquid crystal projection television 100 in FIG. 1.

According to the control system (100+200) configured by including the liquid crystal projection television 100 and the remote 200 as has been described by referring to FIGS. 1 to 7, since the indicator light projection with relatively high power, consumption is performed at the liquid crystal projection television 100 side, power saving can be realized at the remote 200 side that often operates using a battery as a power supply and while being placed on user's hand.

Further, since the indicator light projected from the indicator light projector of the liquid crystal projection television 100 is light in a wavelength region substantially within an invisible region, transmission and reception of information between the liquid crystal projection television 100 and the remote 200 are never perceived by the user of the system. Accordingly, there is no potential to cause any discomfort to the user even during a period in which the liquid crystal projection television 100 adjusts its operation mode while transmitting and receiving information between the liquid crystal projection television 100 and the remote 200.

Furthermore, since the aspect ratio of the display video of the liquid crystal projection television 100 is appropriately adjusted according to the relative position of the remote 200 to the liquid crystal projection television 100, even in the case where a viewer does not observe the screen from an angle in front of the liquid crystal projection television 100, screen display advantageous in visibility, that is, providing natural feeling in video viewing can be performed.

Moreover, the left and right sound balance is adjusted with respect to the stereo speakers according to the relative position of the remote 200 to the liquid crystal projection television 100, even in the case where a viewer does not listen to the sound from the stereo speakers 167 and 168 the screen in a position in front of the liquid crystal projection television 100, both speakers 167 and 168 can be allowed to emit sound so as to provide appropriate acoustic effect to the position.

Figure 8:
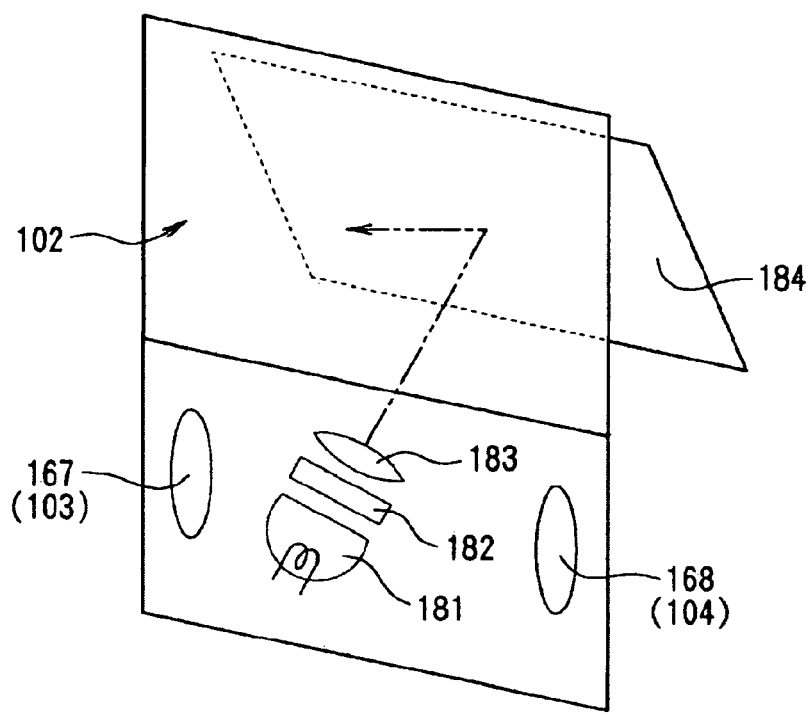
FIG. 8 is a conceptual diagram illustrating a configuration according to an optical system of the liquid crystal projection television in the control system in FIG. 1.

FIG. 8 is a conceptual diagram illustrating a configuration according to an optical system of the liquid crystal projection television 100 in FIG. 1. In FIG. 8, a video output through a light valve 182 illuminated by a lamp 181 is magnification projected from a projection lens 183 onto a mirror 184 and displayed on the screen 102 that has been described by referring to FIG. 1. The left speaker 167 (left speaker 103) and the right speaker 168 (right speaker 104) are also provided as described in FIG. 1. The light valve is provided with respect to each color of R, G, and B, however, they are omitted as one light valve 182 in FIG. 8.

As the light valve, as an example, one with lateral 1280 pixels, longitudinal 720 pixels and aspect ratio 16:9 is applied. In the case of this example, when a signal with lateral×longitudinal of 640×480 as one format of digital broadcasting is input as an input signal, this is converted into a signal in a format that can be displayed in the light valve 182 by the pixel number conversion circuit 146 in FIG. 7. When the aspect ratio of the input signal is 4:3, if the ratio is converted into 1280×720 without change, a video in which the lateral direction is unnaturally elongated is provided.

Accordingly, there is one method of converting the lateral direction into 640×720/480=960 pixels at the same ratio and displaying it by under scan, while keeping the longitudinal 720 pixels. However, in the case where the screen is seen from diagonally lateral direction, the lateral direction contracts and is seen shorter. Accordingly, a parameter is calculated for elongation in the lateral direction according to the position signal supplied from the terminal 151 in the parameter determination circuit 152 that has been described by referring to FIG. 7, display is performed so that the number of pixels in the lateral direction may be increased by the pixel number conversion circuit 146, and thereby, it can be observed naturally when seen from the diagonally lateral direction.

Figure 9:
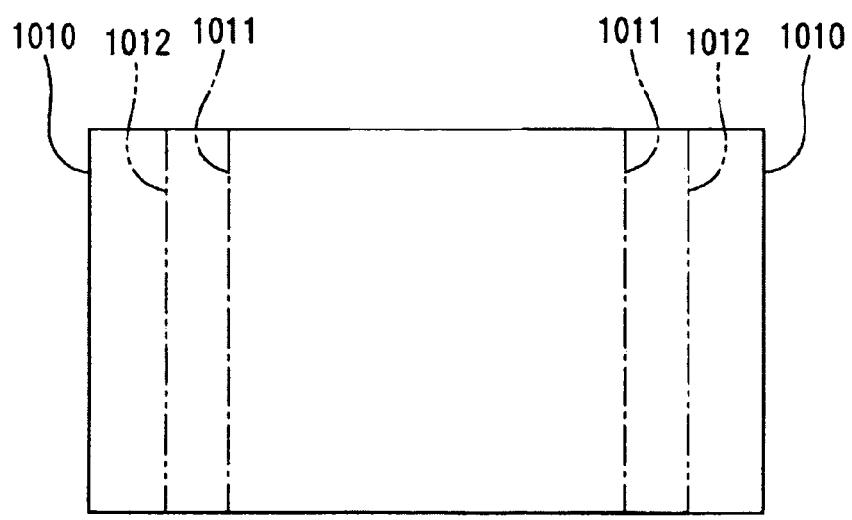
FIG. 9 is a conceptual diagram for explanation of a state in which an input image is under-scan displayed and the lateral direction is further elongated than the under scan display in the embodiment of the invention.

FIG. 9 is a conceptual diagram for explanation of a state in which the input image is under-scan displayed as described above and the lateral direction is further elongated than the under scan display for enabling natural feeling observation even when the screen is seen from the diagonally lateral direction. In FIG. 9, the outer frame 1010 shown by a solid line corresponds to the screen 102 of the liquid crystal projection television 100 with lateral 1280 pixels, longitudinal 720 pixels and aspect ratio 16:9.

Further, the innermost frame 1011 by a dashed line shows the above described under scan display, and the frame 1012 shown by a chain-double dashed line shows an outer frame of a video in the case where the lateral direction is further elongated than the under scan display for enabling natural feeling observation even when the screen is seen from the diagonally lateral direction as described above. In the case where a signal with the same lateral 1280 pixels, longitudinal 720 pixels and aspect ratio 16:9 as the specification of the light valve is input as an input signal, there is one method of displaying it by over scan in the lateral direction, however, natural feeling video display without lack can be performed by compressing the longitudinal direction and displaying it.

Figure 10:
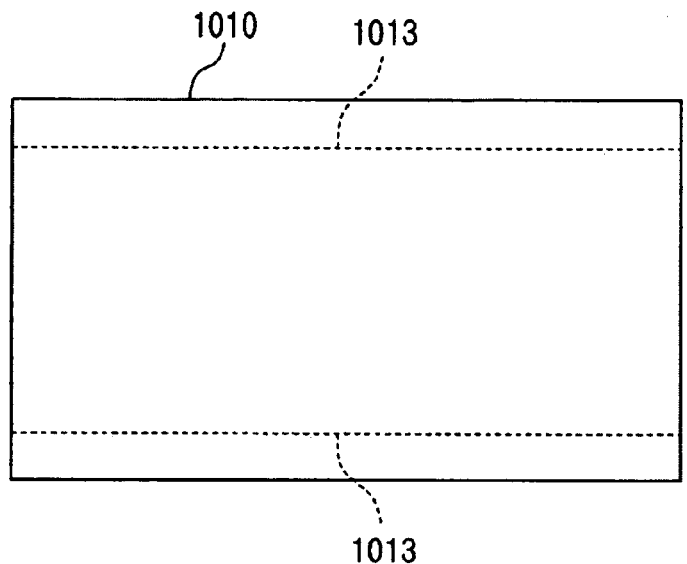
FIG. 10 is a conceptual diagram illustrating a state in which display is performed by compressing the longitudinal direction in place of display by over scanning the input video in the lateral direction in the embodiment of the invention.

FIG. 10 is a conceptual diagram illustrating a state in which display is performed by compressing the longitudinal direction in place of display by over scanning the input video in the lateral direction as described above. In FIG. 10, the outer frame 1010 shown by a solid line corresponds to the screen 102 of the liquid crystal projection television 100 with lateral 1280 pixels, longitudinal 720 pixels and aspect ratio 16:9, and the outer frame 1013 shown by broken lines showing the state in which the longitudinal direction contracts is an outline of a video in the case where the longitudinal direction is compressed.

Figure 11:
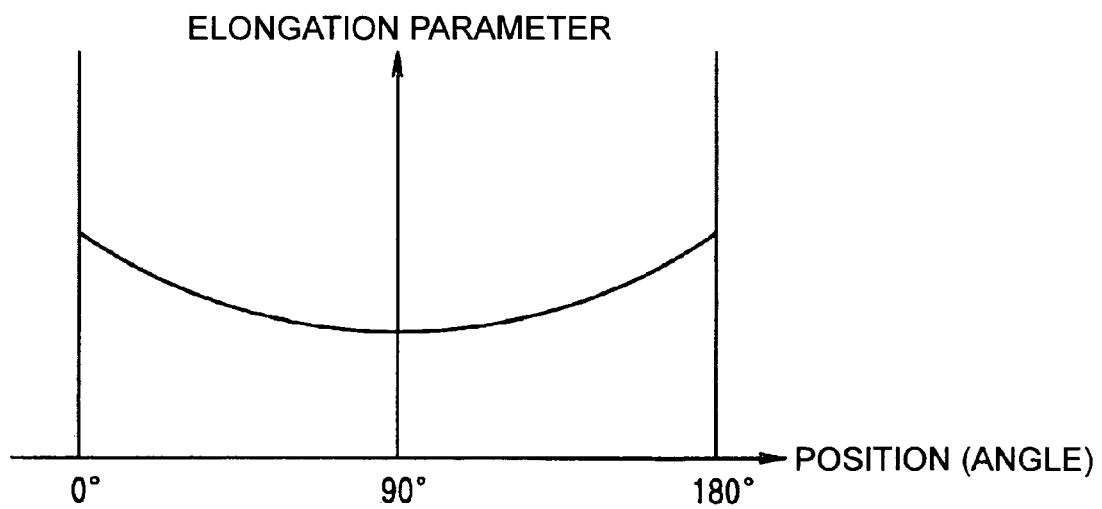
FIG. 11 relatively shows a value of a parameter (rate of elongation) applied to the case where the lateral dimension of the video that has been described by referring to FIG. 9 is elongated.

FIG. 11 relatively shows a value of a parameter (rate of elongation) applied to the case where the lateral dimension of the video that has been described by referring to FIG. 9 is elongated. In FIG. 11, the horizontal axis indicates a direction of a point of view of observation by a viewer (a direction in which the remote 200 is present) that has been described by referring to FIG. 2, and a direction in front of the screen 102 of the liquid crystal projection television 100 is the shown direction at 90 degrees.

The lowest value of the above described parameter is applied with respect to the direction (angle) of the point of view of observation, the parameter exhibits a tendency to gradually increase as the angle increases to left and right from the angle. However, in order to enable natural feeling observation even when the screen is diagonally lateral direction, if the lateral direction of the video is elongated to the degree that the apparent horizontal size is seen as the same as the case where the screen 102 is observed in front thereof as described above, this turns to be an opposite effect of providing an unnatural impression. Accordingly, the parameter is set so as not to extremely elongate the direction.

Figure 12:
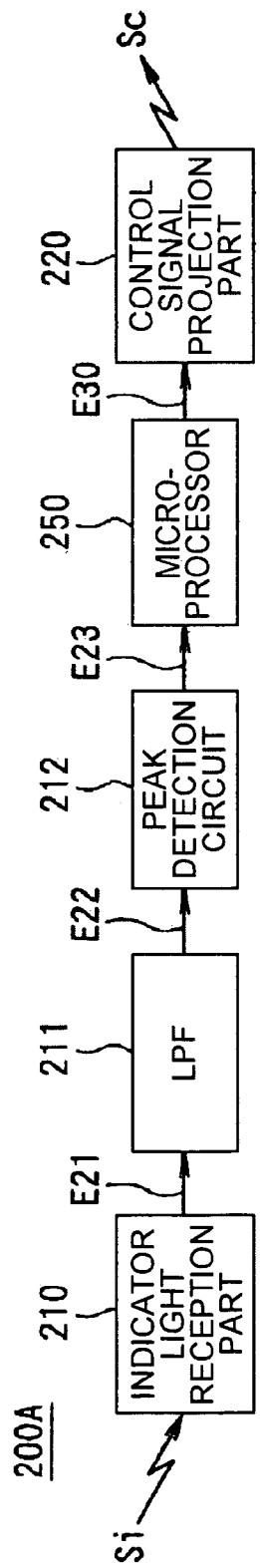
FIG. 12 is a block diagram showing a circuitry of a remote as another embodiment.

FIG. 12 is a block diagram showing a circuitry of a remote 200A as another embodiment. In FIG. 12, the corresponding parts to those above described in FIG. 4 are shown by the same signs. In FIG. 12, the indicator light reception part 210 receives the indicator light Si emitted from the indicator light projection part 110 of the liquid crystal projection television 100 and outputs light reception level signal E21 corresponding to the intensity of the received light. The light reception level signal E21 is smoothed through the low-pass filter (LPF) 211 and output as smoothed signal E22.

The peaks of the smoothed signals E22 are sequentially detected by the peak detection circuit 212 in the next stage, and peak detection signals E23 are output. The signal processing to obtain the peak detection signals E23 is the same as that in the embodiment in FIG. 4. Regarding the subsequent processing, in the embodiment in FIG. 4, only the time interval between two adjacent peaks has obtained at the remote side and the simplification and power saving has been realized in the configuration at the remote side. However, in the embodiment in FIG. 12, a configuration in which a computation for obtaining the relative position of the remote 200A to the liquid crystal projection television 100 is also performed based on the time interval.

That is, the peak detection signals E23 of the peak detection circuit 212 are used for calculating the time intervals between peaks and output to a microprocessor 250. The microprocessor 250 executes computation of obtaining the relative position of the remote 200A to the liquid crystal projection television 100 from the time intervals. In this case, the microprocessor 250 executes the same computation substantially the same as that of the microprocessor 132 that has been described by referring to FIG. 5, generates signal E30 representing the relative position, and supplies it to the control signal projection part 220 in the next stage. The control signal projection part 220 projects the control signal Sc of infrared light or the like corresponding to the signal E30 representing the relative position toward the liquid crystal projection television 100 (light receiving window 105).

Figure 13:
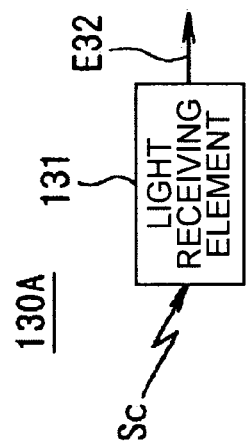
FIG. 13 is a block diagram showing a circuitry of a control signal reception part of the liquid crystal projection television as an embodiment corresponding to the remote in the embodiment in FIG. 12.

FIG. 13 is a block diagram showing a circuitry of a control signal reception part 130A provided at the back of the light receiving window 105 of the liquid crystal projection television 100 as an embodiment corresponding to the remote 200A in the embodiment in FIG. 12. The control signal reception part 130A receives the control signal Sc of infrared light or the like corresponding to the signal E30 representing the relative position of the remote 200A to the liquid crystal projection television 100 that has been described by referring to FIG. 12, and generates a relative position signal E32 taking a format adapted to the circuit at the liquid crystal projection television 100 side and representing information corresponding to the signal E30.

The relative position signal E32 is supplied to the relative position signal input terminal 151 of the liquid crystal projection television 100 as has been described by referring to FIG. 7, and subsequently, as has been described above in FIG. 7, the adjustment of aspect ratio of the video by pixel number conversion processing at the liquid crystal projection television 100 side, balance adjustment by the adjustment of left and right amplification ratios of stereo sound, etc. are executed.

According to the control system (100 (especially, 130A thereof)+200A) that has been described by referring to FIGS. 12 and 13, since the system is not only to obtain signals corresponding to the time intervals between peaks with respect to the level change of the indicator light received by the indicator light receiving part 210 at the remote side as the control apparatus, but also to cover the processing of calculating the relative position of the remote relative to the housing 101 of the liquid crystal projection television 100 as the controlled apparatus based on the signals corresponding to the time intervals, in the case where there is plenty of room for capacity of the signal processing circuit applied to the control apparatus side, such that the microprocessor is applied, the capacity can be sufficiently and effectively utilized and the information representing the above described relative position can be received at the controlled apparatus side from the control apparatus side. Accordingly, apparatus advantageous in responsiveness that does not wait the computation of the relative position can be configured by a simple structure.

Figure 14:
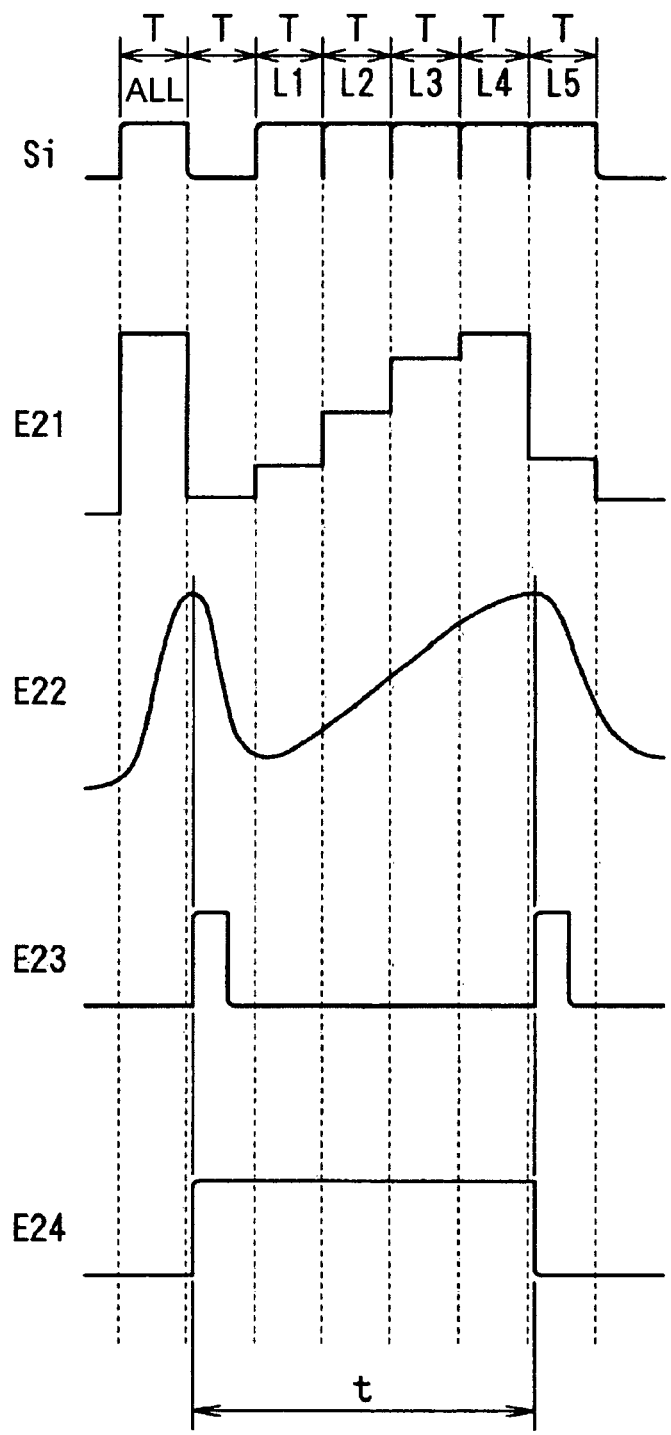
FIG. 14 is a timing chart for explanation of a state of projection of indicator light from the indicator light projection part of the liquid crystal projection television and an operation of a remote that has received the indicator light according to yet another embodiment.

FIG. 14 is a timing chart for explanation of a state of projection of indicator light from the indicator light projection part of the liquid crystal projection television and an operation of a remote that has received the indicator light according to yet another embodiment. In FIG. 14, corresponding parts to those in FIG. 6 are shown by the same signs. In the embodiment in FIG. 6 in which the respective infrared LEDs are sequentially switched and allowed to emit light in the directivities of L5→L4→L3→L2→L1 in FIG. 2, respectively, with period T, and then, after a period of rest for the same time as T, allowed to emit light in the order of L1→L2→L3→L4→L5. Comparatively, the embodiment of FIG. 14 is different in that two or more of the light emitting elements (all elements in the example) are initially allowed to simultaneously emit light in a period of one period T, after a period of rest for the same time as T from the simultaneous emission, allowed to emit light in the order of L1→L2→L3→L4→L5. The light emission operation may be once reset after the end of the emission of the L5, and repeated similarly from L1.

It is assumed that, while all of the infrared LEDs having different directivities are thus initially allowed to emit light, after a period of rest of one period T, sequentially switched and allowed to emit light, the position of the remote 200 (i.e., the position of the indicator light reception part 210) is located in a position of a viewer as a user thereof or a statistic position nearby. Accordingly, the intensity of light reception in the indicator light reception part 210 of the remote 200 indicates the highest value when all of them are initially allowed to emit light. Subsequently, as has been described by referring to FIG. 6, the intensity is relatively stronger as the directivity of the indicator light is nearer the position of the indicator light reception part 210 and relatively weaker, the farther, and exhibits the change as shown by the reception light level signal E21 in FIG. 14.

The signal E21 is smoothed through the low-pass filter (LPF) 211 as described above in FIG. 4, and thereby, smoothed signal E22 in the shape as shown in FIG. 14 is formed. The peaks of the smoothed signals E22 are sequentially detected by the peak detection circuit 212 in FIG. 4 and peak detection signals E23 are output. That is, the peak detection signals E23 as pulse signals generated when the time points where the rate of change shifts from positive to negative as peak positions of the smoothed signals E22 are picked up are output.

As has been described by referring to FIG. 6, since the signals corresponding to the time intervals between peaks according to the change over time are obtained by performing smoothing processing on the change of the light reception levels of the indicator light, information can be obtained for recognizing the relative position of the remote as the control apparatus relative to the housing of the liquid crystal projection television as the controlled apparatus with precision exceeding the resolution with respect to the change over time of the directivity directions of the light emission in the indicator light projector.

As has been described by referring to FIG. 6, the intervals of pulses (the respective rising edges thereof) of the peak detection signals E23 correspond to time intervals between peaks with respect to the level change of the indicator light received by the indicator light projector. The flip-flop (FF) circuit 213 in FIG. 4 that has been supplied with the peak detection signals E23 supplies an output signal E24 that holds H-level over time interval t of adjacent two peak detection signals E23 to a counter 214. In the embodiment of FIG. 14, the directivity directions of the light emission by the infrared LEDs corresponding to the count values (time t) in the counter 214 correspond to the relative position (angle) of the remote 200A relative to the liquid crystal projection television 100.

According to the control system that has been described by referring to FIG. 14, since two or more of the light emitting elements (all elements in the above example) of plural light emitting elements having different emission directivity directions are initially allowed to simultaneously emit light (the first peak with respect to the light reception level), after the simultaneous emission, sequentially switched and allowed to emit light over time (one of them is the second peak with respect to the light reception level), the information based on which the relative position of the control apparatus (remote 200A) relative to the housing of the controlled apparatus (liquid crystal projection television 100) is determined can be obtained without the need of any separate projector of indicator light representing a specified reference position.

As above, since the indicator light projection part 110 of the controlled apparatus (liquid crystal projection television) is configured to be activated in response to the activation command from the control apparatus (remote) and start the projection of the indicator light, and thereby, activated in response to the activation command from the control apparatus that is consciously operated by the user and starts the projection of the indicator light from the controlled apparatus, the wasted power consumption at the time of nonuse can be suppressed.

The entire disclosure of Japanese Patent Application No. 2004-356418, filed Dec. 9, 2004 is expressly incorporated by reference herein.

What is claimed is:

1. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the indicator light projector of the controlled apparatus includes a single light emitting element having a directivity and is configured to rotate the single light emitting element at a constant speed and allow the element to emit light.

2. The control system according to claim 1, wherein the controlled apparatus further has an image display unit in which an aspect ratio of an effective display screen can be varied based on an output of the adjuster.

3. The control system according to claim 1, wherein the controlled apparatus further has a sound emitter in which sound effect can be varied based on an output of the adjuster.

4. A controlled apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus comprising an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, wherein the indicator light projector includes a single light emitting element having a directivity and is configured to rotate the single light emitting element at a constant speed and allow the element to emit light.

5. The controlled apparatus according to claim 4, wherein the relative position recognizer is configured to recognize the relative position of the control apparatus to the housing of the controlled apparatus based on information of the relative position of the control apparatus to the housing of the controlled apparatus represented by the response signal from the control apparatus.

6. A control apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the control apparatus comprising an indicator light receiver that receives the indicator light emitted from the indicator light projector of the controlled apparatus, a response signal forming unit that forms a response signal on which the controlled apparatus relies for recognizing the relative position between the controlled apparatus and the control apparatus based on the indicator light received by the indicator light receiver, and a response signal transmitter that transmits the response signal formed by the response signal forming unit toward the response signal receiver of the controlled apparatus, wherein the response signal forming unit has a time interval measurement unit that obtains a signal corresponding to a time interval between peaks with respect to a level change of the indicator light received by the indicator light receiver and is configured to output an output of the time interval measurement unit as the response signal.

7. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the response signal forming unit of the control apparatus has a time interval measurement unit that obtains a signal corresponding to a time interval between peaks with respect to a level change of the indicator light received by the indicator light receiver and is configured to output an output of the time interval measurement unit as the response signal, and the relative position recognizer of the controlled apparatus includes a relative position computer that determines the relative position of the control apparatus to the housing of the controlled apparatus based on a value of the time interval between peaks represented by the response signal from the control apparatus.

8. The control system according to claim 7, wherein the indicator light projector of the controlled apparatus includes plural light emitting elements having different light emission directivity directions and is configured to sequentially switch the plural light emitting elements over time and allow the elements to emit light.

9. A controlled apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus comprising an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, wherein the relative position recognizer includes a relative position computer that determines the relative position of the control apparatus to the housing of the controlled apparatus based on a value of the time interval between peaks represented by the response signal from the control apparatus.

10. The controlled apparatus according to claim 9, wherein the indicator light projector includes plural light emitting elements having different light emission directivity directions and is configured to sequentially switch the plural light emitting elements over time and allow the elements to emit light.

11. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the response signal forming unit of the control apparatus has a time interval measurement unit that obtains a signal corresponding to a time interval between peaks with respect to a level change of the indicator light received by the indicator light receiver and a relative position calculator that calculates the relative position of the control apparatus to the housing of the controlled apparatus based on an output of the time interval measurement unit, and is configured to output an output of the relative position calculator as the response signal.

12. A control apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the control apparatus comprising an indicator light receiver that receives the indicator light emitted from the indicator light projector of the controlled apparatus, a response signal forming unit that forms a response signal on which the controlled apparatus relies for recognizing the relative position between the controlled apparatus and the control apparatus based on the indicator light received by the indicator light receiver, and a response signal transmitter that transmits the response signal formed by the response signal forming unit toward the response signal receiver of the controlled apparatus, wherein the response signal forming unit has a time interval measurement unit that obtains a signal corresponding to a time interval between peaks with respect to a level change of the indicator light received by the indicator light receiver and a relative position calculator that calculates the relative position of the control apparatus to the housing of the controlled apparatus based on an output of the time interval measurement unit, and is configured to output an output of the relative position calculator as the response signal.

13. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the indicator light projector of the controlled apparatus includes plural light emitting elements having different light emission directivity directions and is configured to perform light emission operation including both switching light emission operations of forward switching light emission operation from one end side of an arrangement of the plural light emitting elements to the other end side and backward switching light emission operation from the other end side to the one end side when sequentially switching the plural light emitting elements over time and allowing the elements to emit light.

14. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the indicator light projector of the controlled apparatus includes plural light emitting elements having different light emission directivity directions and is configured to initially allow two or more of the plural light emitting elements to simultaneously emit light and, after the simultaneous light emission, sequentially switch and allow the elements to emit light.

15. A control system comprising a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus including an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, the control apparatus including an indicator light receiver that receives the indicator light emitted from the indicator light projector of the controlled apparatus, a response signal forming unit that forms a response signal on which the relative position recognizer of the controlled apparatus relies for recognizing the relative position based on the indicator light received by the indicator light receiver, and a response signal transmitter that transmits the response signal formed by the response signal forming unit toward the response signal receiver of the controlled apparatus, wherein the response signal forming unit of the control apparatus has a time interval measurement unit that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, detects a light reception level of the indictor light by the simultaneous light emission received by the indicator light receiver as a first peak, detects a peak of a light reception level detected next to the first peak as a second peak, and obtains a signal corresponding to a time interval between the first peak and the second peak, and is configured to output an output of the time interval measurement unit as the response signal, and the relative position recognizer of the controlled apparatus includes a relative position computer that determines the relative position of the control apparatus to the housing of the controlled apparatus based on a value of the time interval between the first peak and the second peak represented by the response signal from the control apparatus.

16. A control apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the control apparatus comprising an indicator light receiver that receives the indicator light emitted from the indicator light projector of the controlled apparatus, a response signal forming unit that forms a response signal on which the controlled apparatus relies for recognizing the relative position between the controlled apparatus and the control apparatus based on the indicator light received by the indicator light receiver, and a response signal transmitter that transmits the response signal formed by the response signal forming unit toward the response signal receiver of the controlled apparatus, wherein the response signal forming unit has a time interval measurement unit that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, detects a light reception level of the indictor light by the simultaneous light emission received by the indicator light receiver as a first peak, detects a peak of a light reception level detected next to the first peak as a second peak, and obtains a signal corresponding to a time interval between the first peak and the second peak, and is configured to output an output of the time interval measurement unit as the response signal.

17. A controlled apparatus applied to a control system including a controlled apparatus configured to adjust an operation mode of itself based on a control signal supplied from outside of a housing of itself and a control apparatus having an independent casing that can be located in a position separated from the controlled apparatus and configured to emit the control signal to the controlled apparatus, the controlled apparatus comprising an indicator light projector that projects indicator light having a directivity of light in a wavelength region substantially within an invisible region so that an exiting direction thereof may have a known regularity and change over time, a response signal receiver that receives a response signal emitted in response to light reception from the control apparatus that has received the indicator light from the indicator light projector, a relative position recognizer that recognizes a relative position of the control apparatus to the housing of itself based on the response signal received by the response signal receiver, and an adjuster that performs predetermined adjustment operation based on the recognition by the relative position recognizer, wherein the relative position recognizer includes a relative position computer that, when two or more of plural light emitting elements having different light emission directivity directions in the indicator light projector of the controlled apparatus are initially allowed to simultaneously emit light and, after the simultaneous light emission, the respective plural light emitting elements are sequentially switched and allowed to emit light, receives the response signal obtained by detecting a light reception level of the indictor light by the simultaneous light emission as a first peak, detecting a peak of a light reception level detected next to the first peak as a second peak, and generating a signal corresponding to a time interval between the first peak and the second peak, and determines the relative position of the control apparatus to the housing of the controlled apparatus based on a value of the response signal.

* * * * *